UNITED STATES PATENT OFFICE.

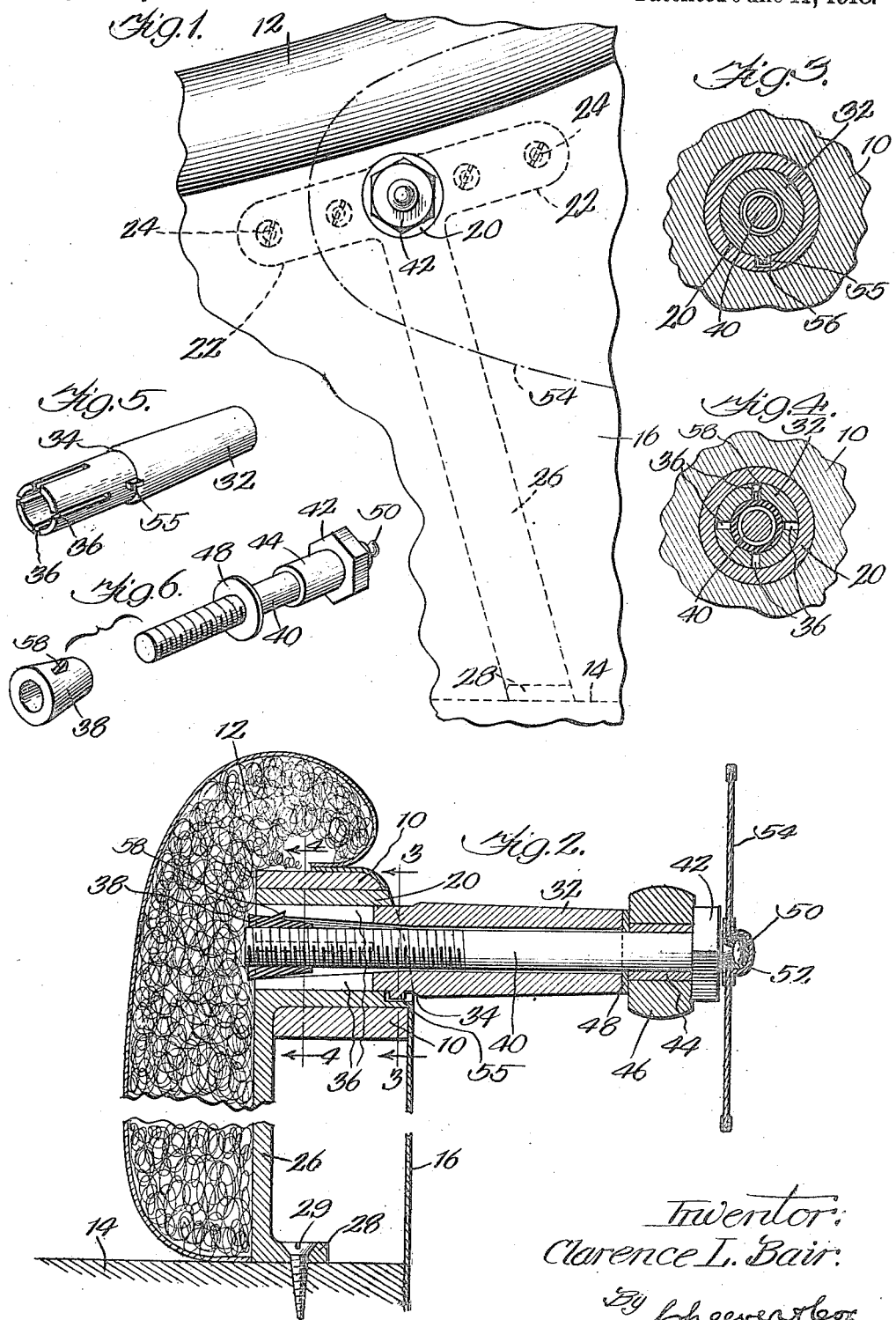

CLARENCE L. BAIR, OF DETROIT, MICHIGAN, ASSIGNOR TO AUTO SPECIALTIES MANUFACTURING CO., OF ST. JOSEPH, MICHIGAN, A CORPORATION OF CALIFORNIA.

REMOVABLE GOOSENECK-IRON.

1,269,364.    Specification of Letters Patent.    Patented June 11, 1918.

Application filed November 16, 1916.   Serial No. 131,614.

*To all whom it may concern:*

Be it known that I, CLARENCE L. BAIR, a citizen of the United States, residing at Detroit, in the county of Wayne and State of Michigan, have invented a certain new and useful Improvement in Removable Gooseneck-Irons, of which the following is a specification.

This invention relates to removable goose neck irons intended to support the bow tops of vehicles, such as automobiles. The object of this invention is to provide a goose neck iron so constructed that it can be readily attached to and removed from the side of a vehicle whenever the latter is converted from a touring car having a top into either an open vehicle with no top or a vehicle having attached thereto what is known as a winter top, in which case the goose neck irons are not only unnecessary, but in the way, and vice versa.

The invention consists in a device capable of carrying out the foregoing objects; which can be easily and cheaply made and installed; which is satisfactory in operation, and not readily liable to get out of order. More in detail, it consists in the special features set forth in the specification and claim.

Referring to the drawings, in which similar numerals indicate the same parts throughout the several views, Figure 1 is a fragmentary side view of the outside of a vehicle equipped with the iron of this invention.

Fig. 2 is a sectional view through the side of such a vehicle and through the center of the iron of this invention.

Fig. 3 is a transverse sectional view taken on the line 3—3 of Fig. 2.

Fig. 4 is a corresponding view on the line 4—4 of the same figure.

Fig. 5 is a perspective view of the body portion of the iron proper separated from all other parts.

Fig. 6 is a perspective view of the bolt which secures the iron of Fig. 5 to the vehicle body, and its coöperating nuts and washers.

Referring to the drawings, and particularly Fig. 2, the upper frame member 10 of the body of an automobile is shown having attached to it the inside cushion member 12 which extends down to the seat board or base 14, the members 10 and 14 being connected on the outside of the automobile with a side plate 16 of any construction well known in the art.

The frame member 10 is bored out so as to admit a tubular metallic bushing 20 from whose sides extend wing members 22, secured to the member 10 by screws or the like at 24. This bushing 20 is also reinforced and held in place by a depending leg 26 having an angularly placed foot 28 secured to member 14 by a screw 29. The result of this construction is that the bushing 20 is securely held in place and the load which is ultimately placed upon it through the goose neck iron proper is carried down directly to the base 14 without putting an undue strain upon the side wall 16 of the automobile body. The bushing 20 may be otherwise supported on the automobile body without departing from the broad idea of this invention.

The body 32 of the goose neck proper consists of a tubular metallic member presenting the general appearance shown in Fig. 5, the right hand end, as viewed in the figure being larger than the left hand end, and there being more or less of a shoulder 34 between them adapted, when the iron is in place as shown in detail in Fig. 2, to bear against the outer end of sleeve 20. The left hand, or smaller end of body member 32 is of such a diameter that it can conveniently and easily slip into the sleeve 20, as shown in Fig. 2, and is provided with a plurality of longitudinal slots 36 designed to render this end of the iron expansible under the action of the conical nut 38 screw threaded to fit onto the threaded end of the bolt 40 shown in detail in Fig. 6, which bolt is designed, in practice, to pass through the body 32 of the iron. This bolt 40 is provided at its outer end with a non-circular head 42 of any suitable construction and adjacent to this head is placed a washer 44 on which any member 46, usually the shank of a bow socket, may be located and against whose end a spring washer 48 takes bearing so as to exert a spring pressure intermediate between the nut 38 and the head 42 to act as a lock.

The outer end of the bolt may, if desired, be provided with one member 50 of a glove fastener device, whose opposite member 52 is designed to hold the curtain 54 in place.

The goose neck iron body member 32 is locked against rotation in the bushing 20 by being made non-circular with reference thereto in any suitable manner; the result in the particular case here illustrated being obtained by providing a lug 55 on the body member 32 entering a corresponding slot 56 formed in the sleeve 20.

In the operation of applying the goose neck iron to the body of an automobile equipped with the sleeve, the workman first takes the body member 32, inserts the bolt 40, and enters it in the nut 38 which latter is equipped with a lug 58 adapted to engage any one of the slots 36 so as to prevent its rotation with reference to the body member 32. The operator does not at this stage tighten the bolt 40 sufficiently to cause the conical nut 38 to expand the end of the bolt. He now inserts the parts just assembled in the position shown in Fig. 2, and then by the use of a wrench or other convenient tool, rotates the nut 42 and consequently the bolt 40 sufficiently to draw the nut 38 into the left hand end of body member 32 a sufficient amount to expand in the body member 32 and thus securely hold the parts in the position of Fig. 2, they being, for all practical purposes locked there, through the operation of the spring 48, heretofore described. When, for any reason, it is desired to remove the goose neck iron from the vehicle, it is only necessary to reverse the order of operations just described.

It will readily be seen from the foregoing description that the device consists of exceedingly few parts, easily and simply constructed, thereby effecting a great saving in the cost of construction over the prior devices, well known in the art.

Having thus described my invention, what I claim as new and desire to secure by Letters Patent, is:—

In combination with the side of a vehicle body having a perforation therethrough at a point below the top edge thereof, a tubular member extending from the inside of the vehicle through said perforation to the front, reinforcing wing members on the inner end of said tubular member suitably secured to the vehicle body to prevent rotation of the tubular member and secure it in place, a goose neck iron body member insertible from outside of the vehicle body through said tubular member, a lug upon the goose neck iron body member insertible in a recess formed in the tubular member to prevent both rotation and longitudinal movement of the goose neck iron member with reference to the tubular member, and a locking device carried on the inner end of the goose neck iron member operated from its outer end adapted to lock it in position in the tubular member with reference to the vehicle body.

In witness whereof, I have hereunto subscribed my name in the presence of two witnesses.

CLARENCE L. BAIR.

Witnesses:
 DWIGHT B. CHEEVER,
 M. S. ROSENZWEIG.

Copies of this patent may be obtained for five cents each, by addressing the "Commissioner of Patents, Washington, D. C."